(12) United States Patent
Benito González et al.

(10) Patent No.: US 8,697,028 B2
(45) Date of Patent: Apr. 15, 2014

(54) CATALYTIC METHOD FOR OBTAINING HYDROGEN OR A HYDROGEN-RICH GAS STARTING FROM BIOETHANOL AND/OR ETHANOL

(75) Inventors: Manuel Jesús Benito González, Plaza Pico de Salvaguardia (ES); Juan Luis Sanz Yagüe, Hontangas (ES); Ruth Isabel Gomez, San Alfonso Rodríguez (ES); Loreto Daza Bertrand, Romero Robledo (ES)

(73) Assignee: Abengoa Hidrogeno, S.A., Seville (ES)

( * ) Notice: Subject to any disclaimer, the term of this patent is extended or adjusted under 35 U.S.C. 154(b) by 0 days.

(21) Appl. No.: 13/435,390

(22) Filed: Mar. 30, 2012

(65) Prior Publication Data

US 2012/0181484 A1    Jul. 19, 2012

Related U.S. Application Data

(62) Division of application No. 11/795,257, filed as application No. PCT/ES2005/000696 on Dec. 21, 2005, now abandoned.

(30) Foreign Application Priority Data

Jan. 14, 2005   (ES) .................................. 200500056

(51) Int. Cl.
    *C01B 3/32*   (2006.01)
(52) U.S. Cl.
    USPC ........................................ 423/648.1; 252/373
(58) Field of Classification Search
    USPC ........................................................ 252/373
    See application file for complete search history.

(56) References Cited

U.S. PATENT DOCUMENTS

| 3,931,393 | A | | 1/1976 | Palilla |
| 5,015,617 | A | | 5/1991 | Ohata et al. |
| 5,254,519 | A | | 10/1993 | Wan et al. |
| 5,861,137 | A | * | 1/1999 | Edlund ......................... 423/652 |

(Continued)

FOREIGN PATENT DOCUMENTS

| EP | 0 414 573 | 2/1991 |
| EP | 0 495 534 | 7/1992 |
| JP | 2004345874 A | * 12/2004 |

OTHER PUBLICATIONS

Supplementary European Search Report issued Mar. 16, 2012 in parallel European Application No. 05 85 0029.

(Continued)

*Primary Examiner* — Melvin C Mayes
*Assistant Examiner* — Kenneth Vaden
(74) *Attorney, Agent, or Firm* — Wenderoth, Lind & Ponack, L.L.P.

(57) ABSTRACT

The invention relates to a catalyst which is used to obtain hydrogen or a hydrogen-rich gas that is suitable for use in fuel cells or other applications from bioethanol and/or ethanol, comprising a support, a promoter agent and an active phase which is incorporated into the support, said catalyst taking the form of a calcinated solid in which the support comprises at least one oxide with high surface mobility and is modified with the promoter agent. According to the invention, the promoter agent comprises at least one oxide of a rare earth that is selected from the lanthanide group and the active phase comprises at least one oxide of a transition metal from group VIII or IB.

7 Claims, 6 Drawing Sheets

(56) References Cited

U.S. PATENT DOCUMENTS 5,989,457 A 11/1999 Seshan et al.
2002/0088179 A1* 7/2002 Lesieur et al. ............... 48/198.7
2004/0022710 A1 2/2004 Kaliaguine et al.

OTHER PUBLICATIONS

H.S. Potdar et al., "Carbon dioxide reforming of methane over co-precipitated Ni-Ce-$ZrO_2$ catalysts", Catalysis Letters, Nov. 2002, vol. 84, Nos. 1-2, pp. 95-100.
G.K. Chuah et al., "The influence of preparation conditions on the surface area of zirconia", Applied Catalysis A: General, Apr. 1996, vol. 145, pp. 267-284.
Athanasios N. Fatsikostas et al. "*Production of hydrogen for fuel cells by reformation of biomass-derived ethanol*", Catalysis Today 75, pp. 145-155 (2002).
Hyun-Seog Roh et al., "*Carbon dioxide reforming of methane over co-precipitated Ni-$CeO_2$, Ni-$ZrO_2$ and Ni-Ce-$ZrO_2$ catalysts*", Catalysis Today 93-95, pp. 39-44 (2004).
Julio César Vargas et al., "*Study of Ce-Zr-Co fluorite-type oxide as catalysts for hydrogen production by steam reforming of bioethanol*", Catalysis Today 107-108, pp. 417-425 (2005).
Jordi Llorca et al., "*Efficient Production of Hydrogen over Supported Cobalt Catalysts from Ethanol Steam Reforming*", Journal of Catalysis 209, pp. 306-317 (2002).

* cited by examiner

CATALYTIC METHOD FOR OBTAINING HYDROGEN OR A HYDROGEN-RICH GAS STARTING FROM BIOETHANOL AND/OR ETHANOL

This application is a Divisional of U.S. application Ser. No. 11/795,257, filed Jun. 23, 2008 now abandoned, which is a national stage application of International Application No. PCT/ES2005/000696, filed Dec. 21, 2005.

TECHNICAL FIELD OF THE INVENTION

The present invention belongs to the technical field of catalysts for reforming of ethanol or bioethanol and the production of hydrogen-rich gas streams which can be used in hydrogen production plants, combustion engines, and, especially, as fuel in fuel cell systems or other alternative uses.

STATE OF THE ART PRIOR TO THE INVENTION

Ethanol is a renewable source of energy that is playing an ever more important role in the quality of the air, the economic security of the agricultural sector and which is inducing changes in the safety of energy policy. The constant advances in enzymatic and processing technology is increasing the viability of the production of ethanol starting from low-cost raw materials. Currently, and on the basis of environmental criteria, the different governments of Europe and America are encouraging the ethanol market by reducing and even eliminating the taxes that are otherwise levied on conventional fuels.

In the same way, fuel cells are an emerging technology capable of increasing the energy efficiency and of drastically reducing the emissions of systems both mobile and stationary, in which this technology finds application.

Automobile manufacturers have identified the infrastructure of fuel as one of the most critical points in determining the choice of technology to apply in vehicles and, therefore, for the application of fuel cells in the transport sector. The advantages of ethanol as fuel derive from the fact that the technology for both distribution and storage is very similar to that used in the case of gasoline. With the introduction of very few modifications to equipment, ethanol could be dispensed in service stations in the same way as gasoline is.

Fuel cells need a source of hydrogen for producing electricity, but hydrogen is difficult to store and transport. Ethanol is a liquid rich in hydrogen, which means that there are no technical barriers to using ethanol as a carrier of hydrogen for applications based on fuel cells. In this way, ethanol could be used as a source of hydrogen both in stationary applications and for mobile applications by means of a reforming process.

A large part of the cost of ethanol production is due to the processes of separation from water since the product directly obtained from fermentation contains between 8% and 12% alcohol. In order to be able to use alcohol in internal combustion engines, or as an additive for gasoline, it is necessary to raise the concentration to levels higher than 99.9%. It has to be considered that this process is very expensive since the ethanol-water system has an azeotrope at a composition of 95.6%. In terms of use as a source of hydrogen for fuel cells, ethanol would need to be submitted to a reforming process with steam, so it would in principle seem more profitable to use mixtures of ethanol and water, which would appreciably reduce the production costs of ethanol. Nevertheless, it needs to be considered that the application of this technology depends very significantly on logistic aspects. In this regard, it is more costly to use road or sea transport for distributing dilute mixtures of ethanol, with the low energy potential that this implies, than to distribute ethanol in a high state of purity. Another aspect to consider is that, on the basis of present-day technology, high water/ethanol ratios are required in order to avoid deactivation of the reforming catalyst. Water that is fed in excess can be fed back into the system, economising its consumption so in this case the optimum thing would be to feed the system with high purity ethanol.

The reforming reaction is a complex reaction in which numerous secondary reactions can occur, with a series of by-products being able to be obtained, among which can be cited: acetaldehyde, methane, carbon monoxide, acetic acid, ethylene, diethyl ether and acetone. The essential difficulty of this reaction lies in the fact that, according to the literature, one needs to work at very high steam/carbon ratios in order to avoid the formation of carbon deposits on the catalyst, which is the essential cause of poisoning of the catalysts that have been developed to date. As stated above, the composition of the ethanol obtained by fermentation is usually between 8-12%. If this concentration is used, the high costs of purification are reduced but the costs of the reforming stage are increased since water, on account of its latent heat, requires a large amount of energy to be evaporated. In order to be able to work in steam/carbon ratios that are as low as possible and achieve an increase in the efficiency of the process, it would be necessary to use catalysts resistant to poisoning which can work under those conditions.

The use of large surface area catalytic supports with surface acidity promotes the dehydration reactions of the ethanol, which leads to the formation of ethylene; ethylene is a highly reactive compound which very easily decomposes to give carbon, which is deposited on the active centres of the catalyst producing its poisoning. This poisoning can be detected from the drop in ethanol conversion, and in the distribution of products obtained, increasing the concentrations of secondary products, such as acetaldehyde, ethane, acetone, ethylene and diethyl ether.

In this framework, use has been made of transition metals which display high catalytic activity and, on the other hand, using supports with low surface acidity, or supports in which their basicity is increased. In this regard, the literature contains catalysts in which the support, specifically alumina, is modified with calcium oxide in order to neutralise its surface acidity and avoid dehydration reactions of the ethanol, successfully reducing the dehydration rate of the catalyst. Another route used consists of basic supports such as magnesium oxide, but the results obtained have not succeeded in increasing the activity and stability of the catalyst in any appreciable way.

Nevertheless, to date, no catalysts are known which would permit catalytic reforming processes to be conducted on ethanol or bioethanol with satisfactory yields of hydrogen, and which would moreover have lasting activity and not be excessively costly.

DESCRIPTION OF THE INVENTION

The present invention has the aim of a novel catalyst for a catalytic process for obtaining hydrogen from bioethanol and/or ethanol which would overcome the drawbacks of the state of the art, a process for the preparation of such catalyst and the use of the catalyst in such catalytic process.

In accordance with the invention, the catalyst is a calcined solid comprising a support, a promoter agent and an active phase incorporated into the support, characterised in that the catalyst is a solid preferably calcined at a temperature of above 600° C., in which the support comprises at least one oxide with high surface mobility, such as for example, zirconium oxide, and is a support modified with the promoter agent, the promoter agent comprises at least one oxide of a rare earth metal selected from the lanthanide group, preferably lanthanum oxide, cerium oxide and combinations thereof, the active phase comprises at least one oxide of a transition metal from group VIII or IB, preferably nickel, cobalt, copper, iron, rhodium, palladium, ruthenium, platinum and combinations thereof.

This catalyst, used in catalytic processes of ethanol and bioethanol reforming, displays high catalytic activity, with a total conversion of ethanol, high selectivity for the production of hydrogen, without the formation of any secondary by-products, and high stability, without any appreciable deactivation after 500 hours of continuous operation, because it contains one or more oxides of group VIII transition metals as active phase, it uses as substrate an oxide with high surface mobility and as promoter one or more oxides of rare earth metals selected from the lanthanide group. Preferably, the transition metal used as active phase is nickel or cobalt, the substrate used as support is zirconium oxide and the rare earth metal used as promoter is lanthanum or cerium and its oxides $La_2O_3$ and $CeO_2$.

In an embodiment of the invention, the catalyst consists of cobalt oxide (transition metal of the active phase), zirconium oxide (high surface mobility oxide) and lanthanum oxide (promoter agent), and it displays the following X-ray diffractogram,

| $2\Theta$ | Relative Intensity |
|---|---|
| 24.31 | W |
| 28.28 | VS |
| 31.52 | S |
| 40.84 | W |
| 44.94 | W |
| 50.24 | M |
| 55.56 | S |
| 62.96 | S |
| 71.32 | S |
| 77.44 | S |
| 89.96 | VW | in which the relative intensity of the lines has been calculated as a percentage with respect to the most intense peak, with a percentage of 80-100 being considered as very strong (vs), a percentage of 70-80 as strong (s), a percentage of 40-60 as medium (m), a percentage of 20-40 as weak (w), and a percentage of 0-20 as very weak (vw).

The catalyst obtained was characterised by X-ray diffraction with diffraction peaks being detected corresponding to cobalt oxide, zirconium oxide and lanthanum oxide. The equipment used in this analysis consisted of a diffractometer from the make SEIFERT 3000P coupled to a computing system for the data gathering and treatment. A record was taken of the diffractograms for an angle lying between 4° and 80°, using the CuKα radiation of wavelength $\lambda$=0.154005980 nm, eliminating the Kβ radiation by means of a nickel filter, the window error being estimated at 0.1 (1+sin θ). The equipment was provided with a secondary monochromator. The identification of the crystalline phases was done taking as reference the X-ray diffraction database of the Joint Committee on Powder Diffraction Standards 1971, managed by means of a computing program known as PDFWIN.

In accordance with a preparation of the catalyst, this can include from 1 to 30% by weight of the promoter agent and from 1 to 15% by weight of the active phase. The catalyst preferably includes from 5 to 11% by weight of the promoter agent and from 3 to 10% by weight of the active phase. In a preferred preparation the catalyst includes from 8 to 10% by weight of lanthanum oxide as promoter agent and from 5 to 7% by weight of cobalt as active phase.

The high surface mobility oxide can have been calcined prior to being modified with the promoter agent. Likewise, the support modified with the promoter agent can have been calcined prior to incorporating the active phase.

When the catalyst is used in a catalytic process of ethanol or bioethanol reforming conducted in fixed bed, with ethanol/water ratios by volume of between 1/1.25 and 1.75, temperatures between 600° C. and 900° C. and pressures between 0 and 3 bar, it has been detected that under these conditions a total conversion of ethanol takes place with selectivity to hydrogen of between 65 and 72%, obtaining carbon monoxide and methane as the sole by-products, in addition to carbon dioxide. In long duration trials of more than 500 hours, conducted under those same conditions, the activity and selectivity of the catalyst was maintained without any signs of deactivation being noticed and without any appreciable formation of other by-products.

The present invention also relates to a preparation process for the catalyst with the characteristics described above. This process comprises a first stage in which the high surface mobility oxide is modified with the promoter agent in order to obtain the modified support, a second stage in which the active phase is incorporated into the modified support in order to obtain a precursor of the catalyst, for example by means of impregnation or adsorption in solution (preferably in an inert solvent), by means of a sol-gel process, by means of microemulsion or co-precipitation, with the precursor being subjected to a drying stage as necessary, and a third stage in which the precursor is subjected to calcination at a temperature of at least 600° C.

In an embodiment of this process one starts with zirconium oxide powder modified with lanthanum oxide or cerium oxide, which is used as support, to which is homogenously incorporated a salt of the active phase, of nickel, cobalt or copper, prior to being calcined in the third stage at high temperature, for example, at a temperature between 700° C. and 900° C.

Likewise, the support can previously be calcined at high temperature, such as for example, at a temperature of at least 700° C., and preferably at a temperature of between 750° C. and 900° C.

The present invention also relates to the use of the catalyst with the properties stated above in a method for obtaining hydrogen starting from bioethanol and/or ethanol, which method is a catalytic process of reforming a carrier (donor) of hydrogen selected from the group comprising ethanol, bioethanol and mixtures thereof, in which the hydrogen carrier is made to react with water, preferably in the form of steam, in the presence of the catalyst, at a temperature between 600° C. and 800° C. in order to obtain a mixture of gases containing hydrogen.

This catalytic process for the production of reformed hydrogen is based on the reaction:

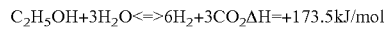

and permits the reforming reaction of ethanol or bioethanol, particularly with ethanol/water ratios by volume of between 1/1.25 and 1/5 and preferably between 1/1.5 and 1/4, inclusive of both. In a particular embodiment the ethanol/water ratio is 1/3 v/v±10% or 1/2 v/v+10%.

For the reaction of the water and the hydrogen carrier, pressures of between 0 and 5 bar are suitable, particularly between 0 and 3 bar. In a preferred embodiment of the process, the water and the hydrogen carrier are made to react at atmospheric pressure. Moreover, the water and the hydrogen carrier can be made to react at a temperature of between 650° C. and 750° C. and particularly at a temperature of 700° C.±5%.

In an embodiment of this use according to the invention, the mixture of gases containing the hydrogen, resulting from the reaction of the hydrogen carrier with the water, is fed to a high temperature fuel cell. In this case, this mixture containing the hydrogen that has been produced can be fed directly to the anode of a high temperature fuel cell, for example, molten carbonate fuel cells (MCFC) or solid oxide fuel cells (SOFC, IT-SOFC) without any need for purification. This is due to the fact that the $CO_2$ would behave as an inert gas and the rest of the compounds present in the gas mixture, such as CO and $CH_4$, would act as fuel in this type of cell, where electricity would be generated by reaction with the oxygen in the air fed to the cathode.

In another embodiment of the use of the invention, the mixture of gases containing the hydrogen, resulting from the reaction of the hydrogen carrier with the water, is subjected to a purification stage in order to convert at least part of the carbon monoxide possibly present in the gas mixture into carbon dioxide in order to obtain a purified mixture of gases, and because said mixture is fed to a fuel cell. This embodiment is especially suitable for the case of intermediate temperature fuel cells, such as for example phosphoric acid fuel cells (PAFC), or low temperature fuel cells, such as for example polymer fuel cells (PEMFC), in which it is necessary to introduce different purification stages in order to reduce the concentration of carbon monoxide to the levels required for the correct functioning of those fuel cells (1% and 50 ppm, respectively). In order to carry out this purification, a reaction known as water gas shift (WGS) can be used, in which the carbon monoxide reacts with water to produce hydrogen and carbon dioxide. The advantage of this reaction is dual, since, as well as eliminating the CO present in the reforming stream, the hydrogen content is also increased. Generally speaking, the surplus concentration of CO that is usually left after the WGS stage is normally higher than what can be fed to a low temperature fuel cell of the polymer type. In order to reduce this concentration of surplus CO there exist various alternatives, among which can be highlighted PSA (Pressure Swing Adsorption) systems, methanation and selective oxidation of carbon monoxide. The water generated in the fuel cell could be recirculated to the hydrogen production process, thus minimising its consumption in the overall scheme of the process.

It can be seen that the present invention not only permits hydrogen to be obtained from bioethanol and/or ethanol, but also the stationary and non-stationary production of that hydrogen with a yield of hydrogen production that is close to thermodynamic under the conditions employed. Moreover, the mixture of gases generated can serve as a direct feed to fuel cells at medium or high temperature.

EXAMPLES

Described below are certain aspects of the invention on the basis of some examples in which reference is going to be made to some figures forming an integral part of this descriptive specification, where FIG. 1 is an X-ray diffractogram of an embodiment of the catalyst of the present invention;

Example 1

Preparation of the Catalyst 5 g of support were weighed out consisting of zirconium oxide modified with 10% of lanthanum oxide at 800° C. 1.299 g of cobalt nitrate hexahydrate were weighed out and dissolved in 100 ml of distilled water. The mixture was subjected to a vacuum of 0.5 to 0.7 bar, an approximate temperature of 70° C. and to a rotation at a speed of 20 rpm for 4 hours until complete dryness. The resulting powder was dried in an oven at 110° C. overnight. It was then calcined in air at 750° C. for 2 hours with a rate of heating of 5° C./min. Finally, the catalyst was left to cool slowly until it reached ambient temperature.

Figure 1:
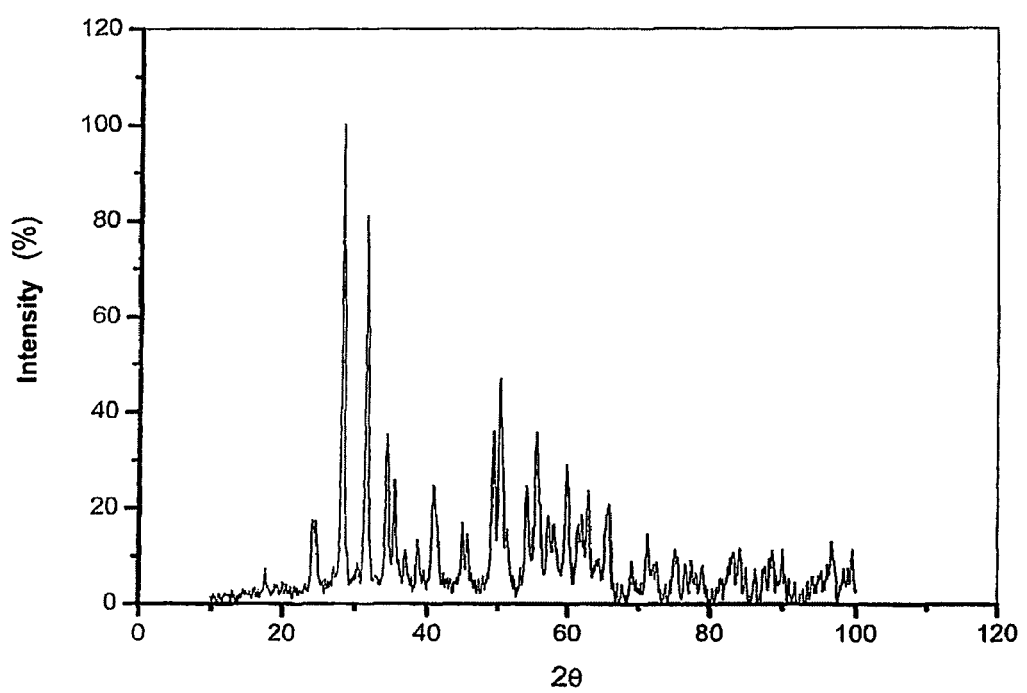

The catalyst obtained was characterised by X-ray diffraction with diffraction peaks being detected corresponding to cobalt oxide, zirconium oxide and lanthanum oxide. The equipment used in this analysis consisted of a diffractometer from the make SEIFERT 3000P coupled to a computing system for the data gathering and treatment. A record was taken of the diffractograms for an angle lying between 4° and 80°, using the CuKα radiation of wavelength λ=0.154005980 nm, eliminating the Kβ radiation by means of a nickel filter, the window error being estimated at 0.1 (1+sin θ). The equipment was provided with a secondary monochromator. The identification of the crystalline phases was done taking as reference the X-ray diffraction database of the Joint Committee on Powder Diffraction Standards 1971, managed by means of a computing program known as PDFWIN. The X-ray diffractogram of the catalyst can be appreciated in FIG. 1, in which can be seen the values appearing in Table 1:

TABLE 1

| Diffraction lines | |
|---|---|
| 2Θ | Relative Intensity |
| 24.31 | W |
| 28.28 | VS |
| 31.52 | S |
| 40.84 | W |
| 44.94 | W |
| 50.24 | M |
| 55.56 | S |
| 62.96 | S |
| 71.32 | S |
| 77.44 | S |
| 89.96 | VW |

Figure 2:
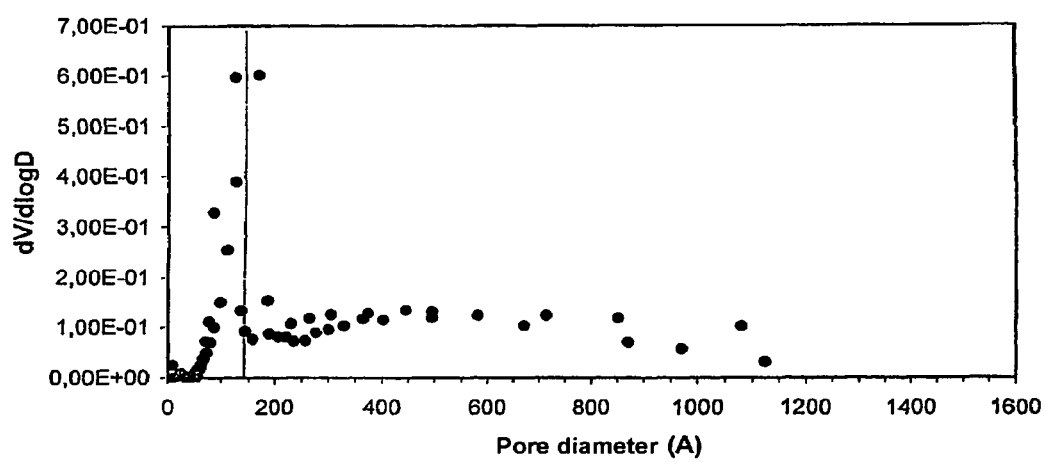
FIG. 2 is a diagram showing the results of the determination of the pore size of samples of the catalyst characterised in FIG. 1.

The catalyst was likewise characterised texturally in order to determine the BET surface area by nitrogen adsorption, presenting a specific surface of 50 $m^2/g$; the nitrogen adsorption/desorption isotherm is characteristic of a mesoporous solid (FIG. 2).

Example 2

Figure 3:
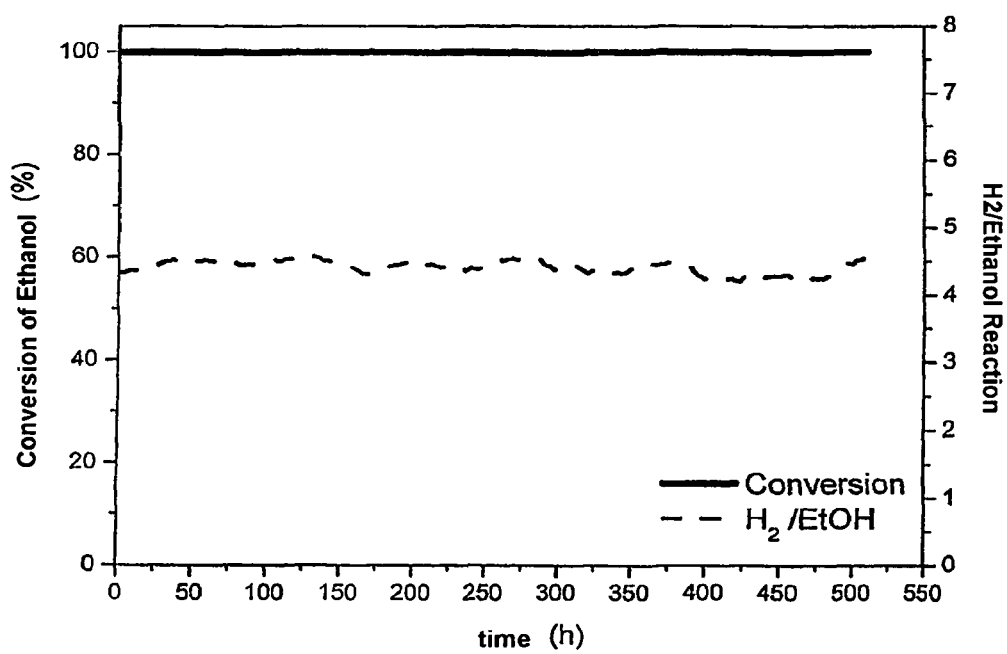
FIG. 3 shows the results of ethanol conversion tests conducted with the catalyst corresponding to FIGS. 1 and 2.
Figure 4:
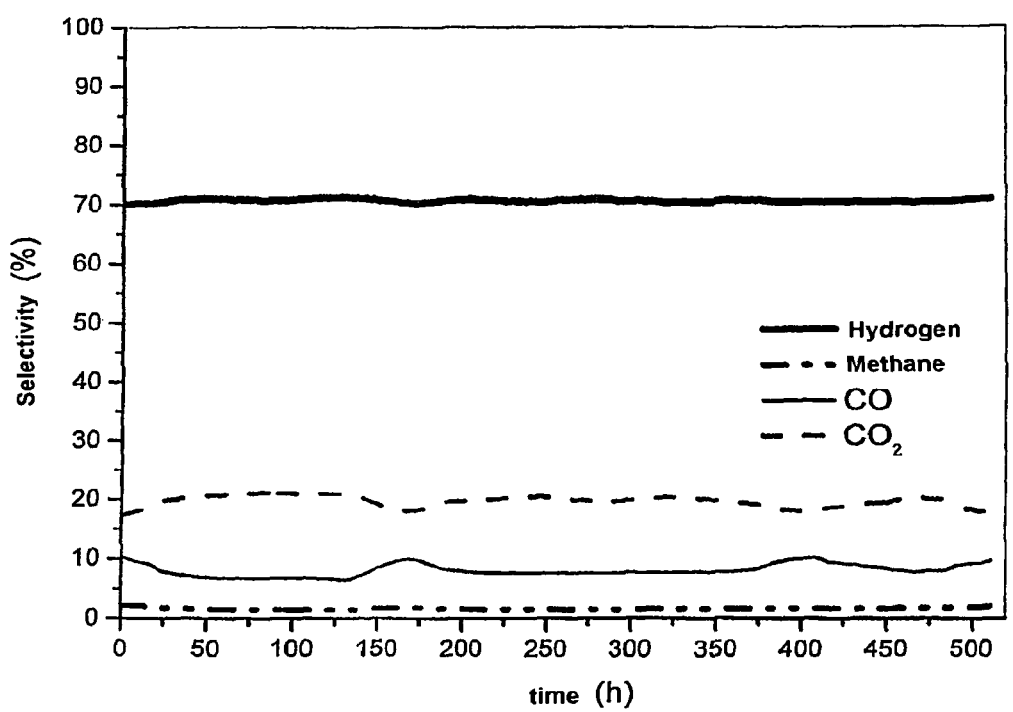
FIG. 4 shows the results of ethanol conversion tests conducted with the catalyst corresponding to FIGS. 1 and 2.

100 mg of catalyst were weighed out, obtained analogously to that stated in example 1, with particle size between sieve sizes 0.42-0.50 mm. Water and ethanol were fed into a reactor in a ratio S/C 6.45 with a total flow of 0.1 ml/min without any carrier gas. The reactor used in the catalytic tests is a stainless steel tube 316-L with a length of 300 mm, an internal diameter of 8.48 mm and external diameter of 14.30 mm. The catalyst is borne inside the catalytic bed with a quartz wool stopper. A thermocouple is introduced via the upper part of the reactor in order to measure the temperature inside the catalytic bed. The reactor is placed in a heating oven of power 1000 W. The array of reactor and oven is located inside a heating box which at all times prevents any condensation of the feed at the reaction outlet. The ethanol reforming reaction was conducted at atmospheric pressure, at a temperature of 700° C. and spatial velocity of 76.430 $h^{-1}$ (GHSV). After 500 hours of operation under these conditions, total conversion of ethanol continued to be obtained with the appearance of $H_2$, CO, $CH_4$ and $CO_2$ as sole products. The composition on dry base obtained in this test is as can be seen in FIGS. 3 and 4.

Example 3

Figure 5:
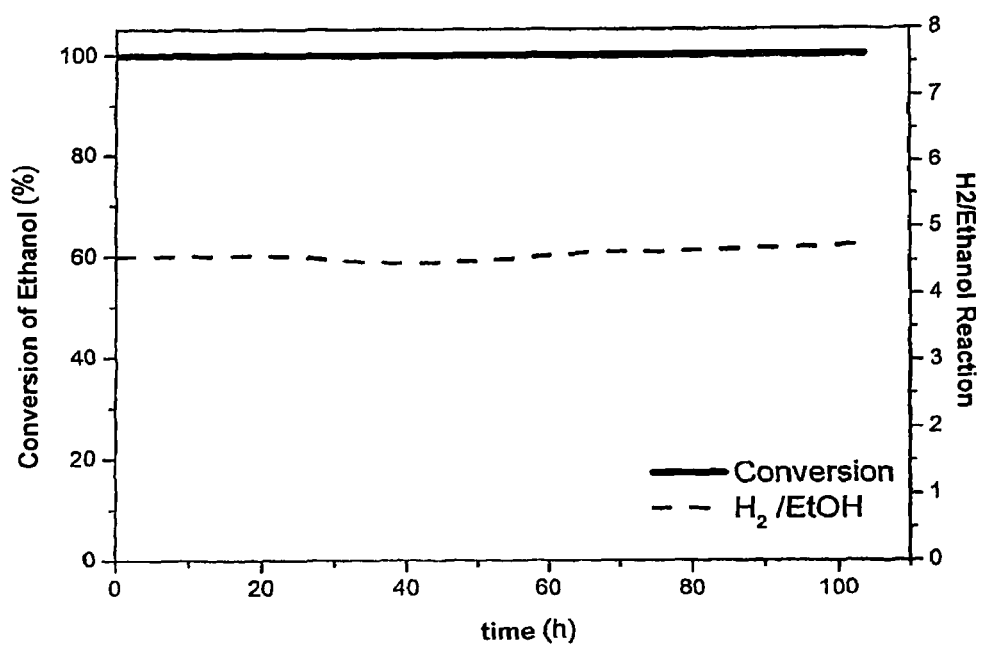
FIG. 5 shows the results of ethanol conversion tests conducted with another embodiment of the catalyst of the present invention.
Figure 6:
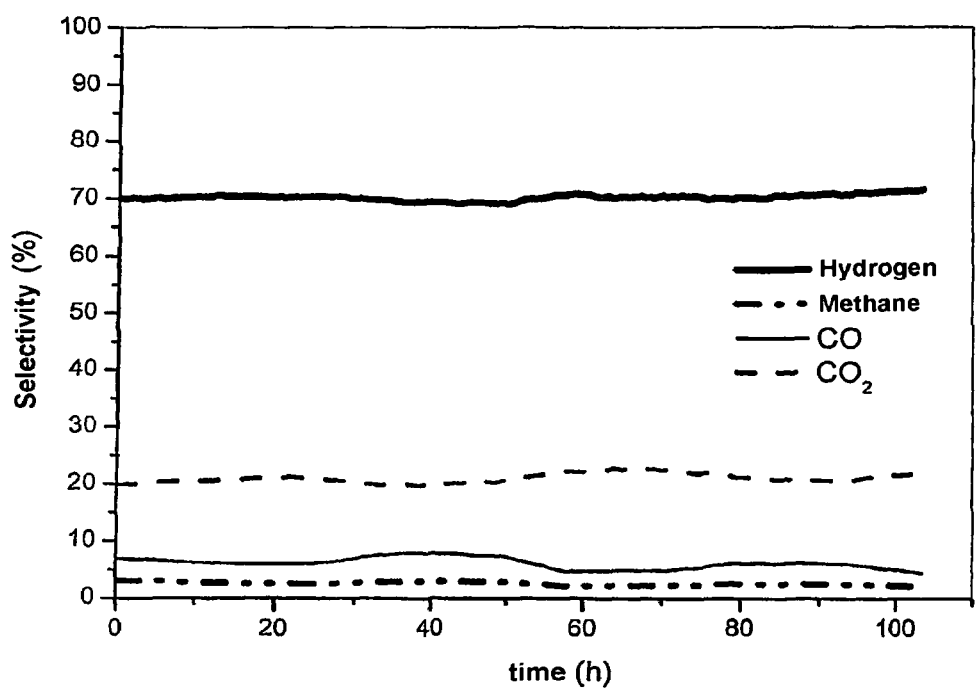
FIG. 6 shows the results of ethanol conversion tests conducted with the same catalyst as that referred to in FIG. 5.

1000 mg of catalyst were weighed out, obtained analogously to that stated in example 1, with particle size between sieve sizes 0.42-0.50 mm. Water and ethanol were fed into a reactor in a ratio S/C 4.84 with a total flow of 0.9 ml/min without any carrier gas. The reactor used is the same as in example 2. The ethanol reforming reaction was conducted at atmospheric pressure, at a temperature of 700° C. and spatial velocity of 66.034 $h^{-1}$ (GHSV). After 100 hours of operation under these conditions, the conversion of ethanol is total and the products present were $H_2$, CO, $CH_4$ and $CO_2$, as can be seen in FIGS. 5 and 6.

The invention claimed is:

1. A method for obtaining hydrogen or a hydrogen-rich gas which is a catalytic process of reforming a hydrogen carrier selected from the group consisting of bioethanol, ethanol and mixtures thereof, comprising reacting the hydrogen carrier with water in the form of steam in the presence of a catalyst at a temperature between 600° C. and 800° C. in order to obtain to mixture of gases containing hydrogen, the catalyst being a calcined solid comprising a support comprising at least one oxide with high surface mobility consisting of zirconium oxide which is modified with 1 to 30% by weight of a promoter agent, said promoter agent being selected from among oxides of lanthanum, oxides of cerium and combinations thereof;

and from 1 to 15% by weight of an active phase selected from the group consisting of nickel, cobalt and combinations thereof, wherein the support is formed by calcining the support at a temperature of at least 700° C. prior to being modified with the promoter agent.

2. The method according to claim 1, wherein the water in the form of steam and the hydrogen carrier are made to react at a pressure between 0 and 5 bar.

3. The method according to claim 1, wherein the water in the form of steam and the hydrogen carrier are made to react in a hydrogen carrier/water ratio of between 1:1.25 and 1:5 v/v.

4. The method according to claim 1, wherein the water in the form of steam and the hydrogen carrier are made to react at a temperature of between 650° C. and 750° C.

5. The method according to claim 1, wherein the gas mixture including the hydrogen resulting from the reaction of the hydrogen carrier with the water in the form of steam is fed to a medium or high temperature fuel cell.

6. The method according to claim 1, wherein the gas mixture including the hydrogen resulting from the reaction of the hydrogen carrier with the water in the form of steam is subjected to a purification stage in order to convert at least part of the carbon monoxide possibly present in the gas mixture into carbon dioxide to obtain a purified mixture of gases.

7. The method according to claim 6, wherein said purified mixture of gases is fed to a fuel cell.

* * * * *